D. O. NATION.
TIRE SPREADER.
APPLICATION FILED MAY 5, 1919.
1,354,457.
Patented Sept. 28, 1920.
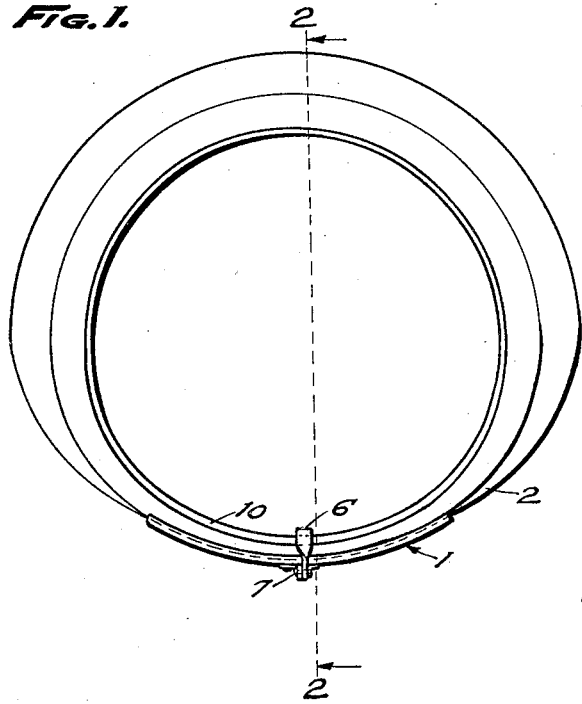
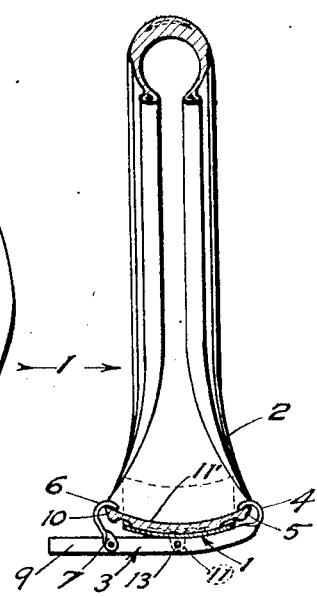
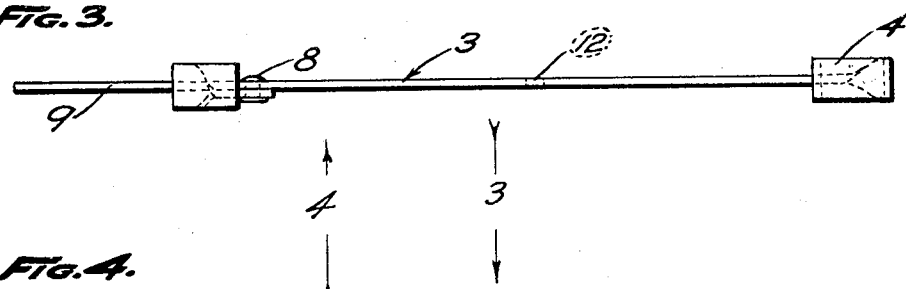
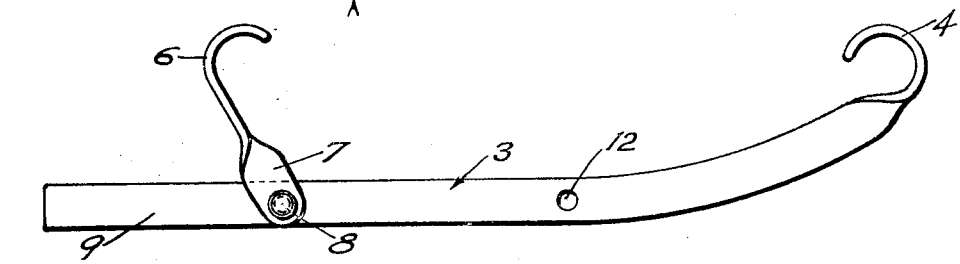
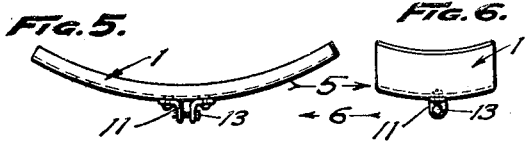
INVENTOR.
DON O. NATION.
BY Hazard & Miller
ATTORNEYS.

UNITED STATES PATENT OFFICE.

DON O. NATION, OF HOLLYWOOD, CALIFORNIA, ASSIGNOR OF ONE-HALF TO WILLIAM E. NATION, OF LOS ANGELES, CALIFORNIA.

TIRE-SPREADER.

1,354,457.  Specification of Letters Patent.  Patented Sept. 28, 1920.

Application filed May 5, 1919. Serial No. 294,969.

*To all whom it may concern:*

Be it known that I, DON O. NATION, a citizen of the United States, residing at Hollywood, in the county of Los Angeles and State of California, have invented new and useful Improvements in Tire-Spreaders, of which the following is a specification.

My object is to make a simple tire spreader, and my invention consists of the novel features herein shown, described and claimed.

Figure 1 is a side elevation of a pneumatic tire casing with a tire spreader, embodying the principles of my invention, in position for use.

Fig. 2 is a cross section on the line 2—2 of Fig. 1.

Fig. 3 is a top plan view upon an enlarged scale and showing a tire spreader removed from the tire, the view being taken looking in the direction indicated by the arrow 3 in Fig. 4.

Fig. 4 is a side elevation looking in the direction indicated by the arrow 4 in Fig. 3.

Fig. 5 is a side elevation of the bearing plate as seen looking in the direction indicated by the arrow 5 in Fig. 6.

Fig. 6 is an end elevation of the bearing plate as seen looking in the direction indicated by the arrow 6 in Fig. 5.

The bearing plate 1 fits the tread of the pneumatic tire casing 2 and is flatter than the normal contour of the tread in cross section. The main bar 3 of the tire spreader is a piece of heavy strap iron and fits edgewise against the bearing plate 1, and one end of the bar 3 is twisted and bent to form a hook 4 to engage over the bead 5 of the casing 2. The hook 6 is formed of similar metal and is bent in the opposite direction from the hook 4, and the metal forming the hook 6 is twisted to form the attaching plate 7, and the attaching plate 7 is loosely secured to the bar 3 by a rivet 8.

In forming the bar 3 the strap of iron is left long enough to form a handle 9 extending beyond the rivet 8.

In the practical operation the bearing plate 1 is pressed against the tread of the tire casing 2, the hook 4 is engaged over the bead 5, and the bar 3 brought around against the bearing plate 1, and the bead 10 pulled over and engaged under the hook 6.

A bifurcated bearing 11 is secured to the lower face of the bearing plate 1 at its center and an opening 12 is formed through the center of the bar 3, so that when desired the bar 3 may be placed in the bifurcation of the bearing 11, and a pin 13 inserted to connect the bar 3 to the bearing plate 1.

The tension of the casing will hold the tire spreader in place while the interior face 11' of the casing 2 is inspected and repaired. The tire spreader may be slid to a limited extent in either direction along the beads 5 and 10.

The bearing plate 1 serves as a foundation for supporting the casing while work is being performed upon the inner face of the casing and the bar and hooks hold the bearing plate in place against the casing.

Especial attention is called to the fact that the hooks and bar are against the outer face of the casing and that the inner face of the casing is clear and free to be worked upon while the tire spreader is in place. The bearing plate may be omitted if desired.

Various changes may be made without departing from the spirit of my invention as claimed.

I claim:

1. A tire spreader comprising a concave bearing plate adapted to fit against the tread of a tire casing, a bar having a rigid hook to engage one bead, said bar fitting against the bearing plate, and a second hook pivotally connected to the bar to engage the other bead.

2. A tire spreader comprising a concave bearing plate adapted to fit against the tread of a tire casing, a bar having a rigid hook to engage one bead, said bar fitting against the bearing plate, a second hook pivotally connected to the bar to engage the other bead, and a handle extending beyond the second hook.

3. A tire spreader comprising a concave bearing plate properly shaped and adapted to fit against the tread of a tire casing, a bar having a rigid hook to engage one bead, said bar fitting against the bearing plate, and a second hook connected to the bar to engage the other bead, said bar extending across the outer face of the tire tread so as to leave the inner face of the casing free to be worked upon.

4. A tire spreader, comprising a concave bar adapted to fit against the tread of a tire casing, said bar having a rigid hook to engage one bead, and a second hook pivotally connected to the bar to engage the other bead.

In testimony whereof I have signed my name to this specification.

DON O. NATION.